Jan. 22, 1935.  H. VAN DEEST  1,988,638
SLIDABLE SEAT
Filed Dec. 22, 1932
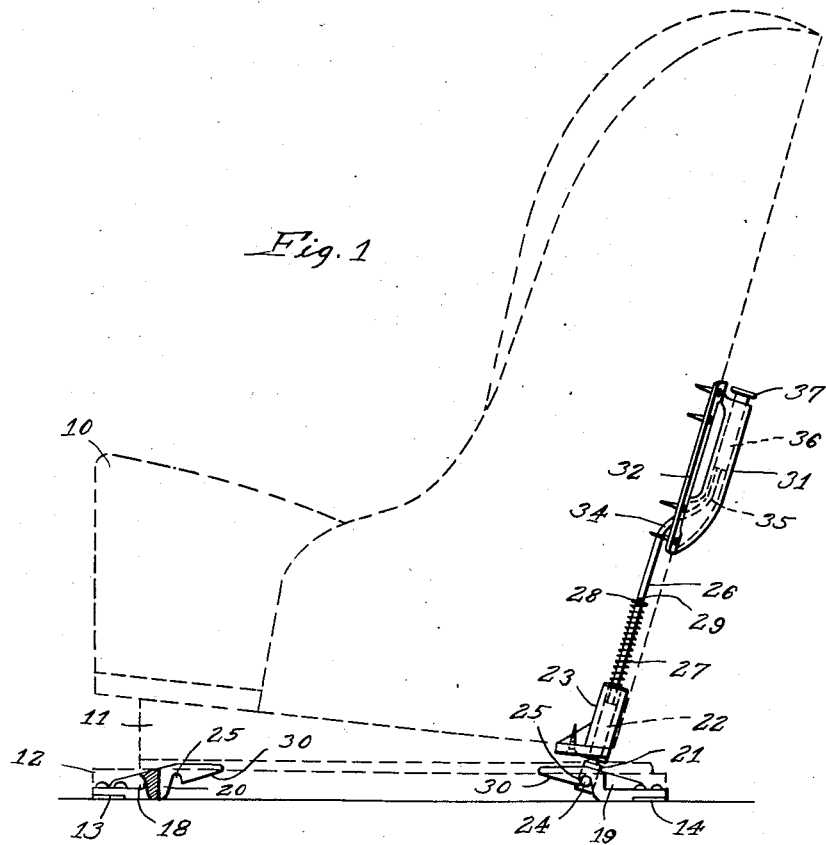
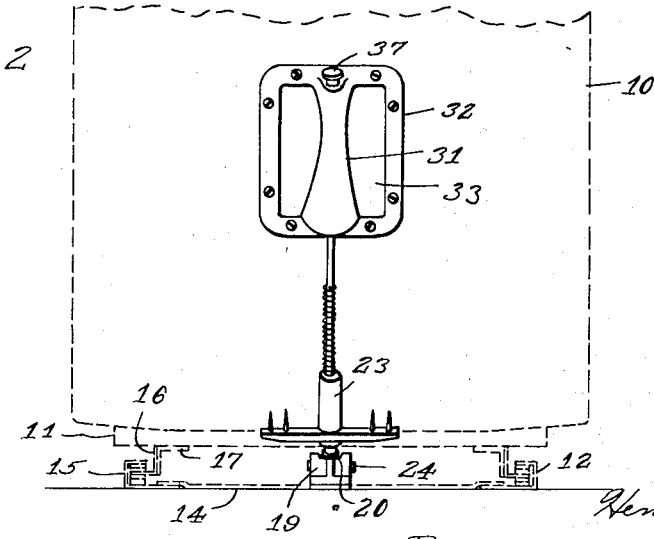
Inventor:
Henry Van Deest
By Wilson, Dowell, McCanna & Wintercorn
Attys.

Patented Jan. 22, 1935

1,988,638

UNITED STATES PATENT OFFICE 1,988,638

SLIDABLE SEAT

Henry Van Deest, Freeport, Ill., assignor to Henney Motor Company, Freeport, Ill., a corporation of Delaware Application December 22, 1932, Serial No. 648,416

10 Claims. (Cl. 155—14)

This invention relates to a slidable seat adapted for a variety of purposes, but especially designed and intended for use in vehicles. For example, seats of this type have been used in hearses where it is desired to have the two seats slidable forward to provide clearance for the table movable into and out of the hearse for side servicing. Furthermore, such seats have also been used in automobiles, especially in the coach type as a matter of convenience for rear seat passengers leaving or entering the car.

The principal object of my invention consists in providing simple and effective means for locking the seat in its normal position and in such a way that it requires very little effort to unlock the same when it is to be moved. A special feature is the combining of a handle on the back of the seat for moving it back and forth, and a latch operating plunger whose operating knob projects from one end of the handle for convenient operation by the thumb as the handle is gripped for sliding the seat.

The invention is illustrated in the accompanying drawing, in which—

Figure 1 is a phantom side view of a slidable seat illustrating my invention, and Fig. 2 is a phantom rear view further illustrating my invention.

The slidable seat designated generally by the reference numeral 10 has the bottom 11 thereof supported on a sliding structure 12 to permit movement forwardly from the normal position shown in Figure 1. The slide structure 12 may be of any suitable form, although I prefer the one disclosed in my copending application Serial No. 600,180, filed March 21, 1932, the same being of a rollerless type. For the present purposes, it will suffice to state that front and rear crossmembers 13 and 14 hold a pair of channel-shaped guides 15 in parallel relation and suitably fixed to the floor of the vehicle, to slidably receive therein the outwardly projecting longitudinal flanges of a pair of slides 16 of angular crosssection suitably supported on the seat bottom 11 as by members 17. As described in the other application, strips of material, such as formica, having a hard smooth surface are mounted on the top and bottom surfaces of the flanges on the slides 16, and similar strips are mounted on the guides 15 for sliding contact therewith to make the seat slide smoothly and easily and without noise, even though no lubricant is used.

The seat is limited in its forward movement by a bracket or keeper plate 18 on which the seat is also adapted to be locked, as will soon appear. The bracket 18 is riveted, or otherwise suitably secured to the front cross-member 13. Another bracket or keeper plate 19, identical in form to the bracket 18, but extending in the opposite direction, is secured on the rear cross member 14 and serves to limit rearward movement of the seat besides being adapted to have the seat locked thereon, as will soon appear. The two stop or keeper brackets have forked inner ends, as indicated at 20, to receive a latch 21 therein provided on the lower end of a plunger 22 slidable up and down in a guide 23 secured to the seat bottom at the back of the seat. A cross-pin 24 on the latch 21 is arranged to enter detent recesses 25 provided therefor on the lower sides of the forked portions of the brackets, to lock the seat in either of its two limit positions. An actuating rod 26 extends upwardly from the plunger 22 out of the guide 23 and has a coiled compression spring 27 held in place thereon by means of a washer 28 and cotter pin 29, with the spring under slight compression sufficient to urge the plunger 22 upwardly, whereby to hold the cross-pin 24 seated in the recess 25 of either bracket. When the cross-pin is disengaged from the recess by a downward movement of the plunger 22 against the action of the spring 27, in the manner later described, and the seat is moved away from the bracket, the spring 27 moves the plunger 22 upwardly until the latch 21 strikes the bottom of the guide 23, the latch being in the nature of an enlargement of the plunger 22, as shown. In that way, it is evident that the cross-pin 24 will be in the proper horizontal plane to engage the inclined bottom surface 30 on the forked portion of either bracket, so that the cross-pin will ride into the detent recess by simply moving the seat to the limit position, the spring 27 being compressed as the cross-pin rides down the inclined surface until the pin arrives at the recess, whereupon the spring causes the plunger to move upwardly to engage the pin in the recess.

It will now be observed that the guide 23 with the plunger 22 therein, together with the actuating rod 26 and spring 27, is housed inside the back of the seat for neatness in appearance, and incidentally to avoid having anything come in contact with the moving parts and damaging the same. A hollow handle 31, having an attachment plate 32 suitably formed integral therewith providing for hand room at 33, is suitably secured to the back of the seat far enough down to be in approximately the same plane with the center of gravity of the seat so that one may use the handle to move the seat back and forth with minimum effort, there being no tendency for the seat to cock forward or backward when it is slid forwardly or rearwardly. The upper end of the rod 26 is bent rearwardly, as at 34, to enter the lower end of the handle 31, and is bent upwardly, as at 35, for connection with a plunger 36 slidably received in the upper end of the handle and having a knob 37 on the upper end thereof projecting from the handle for operation by thumb pressure. In this way, one may release the latch 21 by depression of the knob 37 with the thumb as the handle 31 is gripped to slide the seat in either direction. Once the latch is released the seat can be slid freely, and when it arrives at the limit of its movement the latch automatically locks in the detent recess of the bracket at that end of the travel. It is manifest that everything but the handle and the release knob is concealed, so that the seat presents a neat and attractive appearance. The fact that the seat can be unlocked and slid with one hand avoids the objections inherent in other constructions with which I am familiar, where the seat had to be unlocked with one hand and moved simultaneously with the other. Usually, in such cases, aside from the awkwardness of such operation, there was the objection that the release device was so located that one could not get hold of the seat at the proper place to move it most conveniently. By locating the handle and the release at one point in the proper relation to the center of gravity those objections are entirely avoided and the seat can be slid with an absolute minimum expenditure of effort.

It is believed the foregoing description conveys a good understanding of the objects and advantages of my invention. The appended claims have been drawn with a view to covering all legitimate modifications and adaptations.

I claim:

1. A device of the class described, comprising a seat having a rigid back, means slidably supporting the seat for back and forth movement, keeper means for holding the seat in one or more selected positions, a latch for engagement with the keeper means slidably mounted for up and down movement on the back of the seat, the same having an actuating rod extending upwardly therefrom, and a handle on the back of the seat for sliding the same, the actuating rod having its upper end disposed to permit single handed unlocking and sliding of the seat.

2. A device of the class described, comprising a seat having a rigid back, means slidably supporting the seat for back and forth movement, keeper means for holding the seat in one or more selected positions, a latch for engagement with the keeper means slidably mounted for up and down movement on the back of the seat, spring means normally urging said latch in one direction toward locked position, and an actuating rod extending upwardly from the latch along the back of the seat and arranged to be moved in the other direction by hand against the action of said spring means to release the latch.

3. A device of the class described, comprising a seat having a rigid back, means slidably supporting the seat for back and forth movement, keeper means for holding the seat in one or more selected positions, a latch for engagement with the keeper means slidably mounted for up and down movement on the back of the seat, spring means normally urging said latch in one direction toward locked position, an actuating rod extending upwardly from the latch along the back of the seat and arranged to be moved in the other direction by hand against the action of said spring means to release the latch, and a handle on the back of the seat at the upper end of said rod to permit single handed unlocking and sliding of the seat.

4. A device as set forth in claim 3 wherein the handle is hollow and disposed in a substantially vertical plane and wherein the upper end of said rod is extended through the handle and projects from the upper end of the latter so as to permit thumb depression of the rod and grasping of the handle, both by one hand.

5. A device as set forth in claim 3 wherein the parts mounted on the back of the seat are all with the exception of the handle concealed inside the back of the seat, the handle being hollow and the upper end of the rod being bent rearwardly to project into the handle and being bent upwardly for extension through the handle and projecting from the upper end thereof, whereby to permit thumb depression of the rod while the handle is grasped, both operations being adapted to be performed by the same hand.

6. A device as set forth in claim 2 wherein the keeper means comprises a pair of brackets at opposite limits of the travel of the seat having detent recesses provided therein, the latch having a cross-pin to engage in the recesses, said brackets having inclined surfaces leading toward said recesses with the entry ends of said surfaces disposed so that the cross-pin comes into engagement therewith and rides on the surfaces against the action of the spring means for engagement in the recesses.

7. A device as set forth in claim 2 wherein the keeper means comprises a pair of brackets disposed at the limits of travel of the seat, said brackets having forked portions projecting toward each other parallel to the direction of travel of the seat, the latch being arranged to enter said forked portions and having a cross-pin adapted to enter detent recesses provided in said portions, said portions being formed with inclined surfaces extending toward the recesses, whereby the cross-pin is arranged upon engagement with said surfaces to ride on the same against the action of the spring means for engagement in the recesses.

8. A device of the class described, comprising a seat, a fixed support, means supporting the seat on said fixed support for movement through a predetermined travel, keeper means secured to said fixed support, latch means secured to the seat and normally engaging the keeper means for locking the seat detachably in position, a handle on the seat by means of which the seat is adapted to be moved when the latch means is released from the keeper means, said handle being of hollow construction, and a latch actuating member extending through the handle and projecting therefrom so as to permit manual operation thereof by one and the same hand grasping the handle.

9. A device of the class described, comprising a seat, a fixed support, means for supporting the seat on said fixed support for movement through a predetermined travel, keeper means secured to said fixed support, latch means secured to the seat and normally engaging the keeper means for locking the seat detachably in position, a handle on the seat by means of which the seat is adapted to be moved when the latch means is released from the keeper means, said handle having a longitudinal passage provided therein, and a latch actuating member extending through said passage in the handle and projecting from one end thereof so as to permit thumb operation of the latch and movement of the seat by means of the handle, both by one hand.

10. In a slidable seat having a rigid back, a fixed support, means slidably supporting the seat on said fixed support for back and forth movement, keeper means secured to said fixed support, latch means secured to the seat and normally engaging the keeper means for detachably locking the seat in an adjusted position, a latch actuating member extending upwardly from the latch along the back of the seat, and a handle mounted on the back of the seat in approximately the same horizontal plane as the center of gravity of the seat whereby to permit easy movement of the seat back and forth by pull and push movement of the handle, said handle being also disposed adjacent the upper end of the actuating member whereby to permit operation of the latch by the same hand grasping the handle.

HENRY VAN DEEST.